(12) United States Patent
Dhurjaty et al.

(10) Patent No.: US 7,456,409 B2
(45) Date of Patent: Nov. 25, 2008

(54) LOW NOISE IMAGE DATA CAPTURE FOR DIGITAL RADIOGRAPHY

(75) Inventors: Sreeram Dhurjaty, Rochester, NY (US); Timothy J. Wojcik, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 113 days.

(21) Appl. No.: 11/191,537

(22) Filed: Jul. 28, 2005

(65) Prior Publication Data
US 2007/0023668 A1    Feb. 1, 2007

(51) Int. Cl.
*G01T 1/24* (2006.01)
(52) U.S. Cl. ............ 250/370.09; 250/370.08; 250/370.11; 250/369
(58) Field of Classification Search ............ 250/370.08, 250/370.09, 370.11
See application file for complete search history.

(56) References Cited

U.S. PATENT DOCUMENTS

| | | | | |
|---|---|---|---|---|
| 3,679,826 A | * | 7/1972 | Crowell | 348/307 |
| 4,797,562 A | * | 1/1989 | Dietrich | 348/301 |
| 5,084,639 A | * | 1/1992 | Ribner | 327/311 |
| 5,461,425 A | * | 10/1995 | Fowler et al. | 348/294 |
| 5,466,892 A | * | 11/1995 | Howard et al. | 174/261 |
| 5,962,856 A | * | 10/1999 | Zhao et al. | 250/370.09 |
| 6,271,785 B1 | * | 8/2001 | Martin et al. | 341/169 |
| 6,292,529 B1 | * | 9/2001 | Marcovici et al. | 378/19 |
| 6,741,198 B2 | * | 5/2004 | McIlrath | 341/155 |
| 2003/0053587 A1 | * | 3/2003 | Demharter | 378/19 |
| 2006/0071174 A1 | * | 4/2006 | Spartiotis et al. | 250/370.13 |

FOREIGN PATENT DOCUMENTS

| | | |
|---|---|---|
| DE | 101 40 863 A1 | 8/2001 |
| EP | 0 936 660 A1 | 2/1999 |
| WO | 01/69284 A1 | 3/2001 |
| WO | 2004/071299 A1 | 2/2004 |

* cited by examiner

*Primary Examiner*—David P Porta
*Assistant Examiner*—Casey Bryant (57) ABSTRACT

A low noise digital radiography image capture system employs a two-dimensional array of pixel sites in the image capture panel with each site having an analog-to-digital converter to digitize analog charge values produced by imaging radiation directly into corresponding digital data at the site prior to read-out to subsequent digital data processing electronics thereby avoiding noise and crosstalk problems associated with high frequency read-out of analog information. Fill factor problems caused by inclusion of integrated circuitry on the pixel site are minimized by inclusion of the A/D counter on the opposite side of the substrate support for the pixel site.

13 Claims, 8 Drawing Sheets

FIG. 1

(PRIOR ART)

FIG. 8B FET SWITCH

FIG. 8C COMPARATOR OUTPUT

FIG. 8D UP/DOWN

LOW NOISE IMAGE DATA CAPTURE FOR DIGITAL RADIOGRAPHY

FIELD OF THE INVENTION

The general field of this invention is digital image radiography and, in particular, radiographic imaging screens utilizing low noise electronics for image data capture.

BACKGROUND OF THE INVENTION

Digital radiography is achieving a growing acceptance as an alternative to photographic-based imaging technologies that rely on photographic film layers to capture radiation exposure to produce and store an image of a subject's internal physical features. With digital radiography, the radiation image exposures captured on radiation sensitive layers are converted, pixel by pixel, to electronic image data which is then stored in memory banks for subsequent read-out and display on suitable electronic image display devices. One of the driving forces in the success of digital radiography is the ability to rapidly communicate stored images via data networks to one or more remote locations for analysis and diagnosis by radiologists without the delay caused by having to send physical films through the mail or via couriers to reach the remotely located radiologists.

Of critical importance in digital radiology technology is the need to create high-resolution electronic image data that is preferably at least as high in resolution as its photographic based counterpart. The amount of image data that must be processed and the consequent frequency bandwidth of the signal processing circuits needed to achieve the necessary data processing within a given time frame is a multifunctional consideration based on such factors as the size of each pixel, the pixel array size, the maximum range of pixel exposure to be detected, and detectable exposure density gradients of each pixel.

Figure 1:
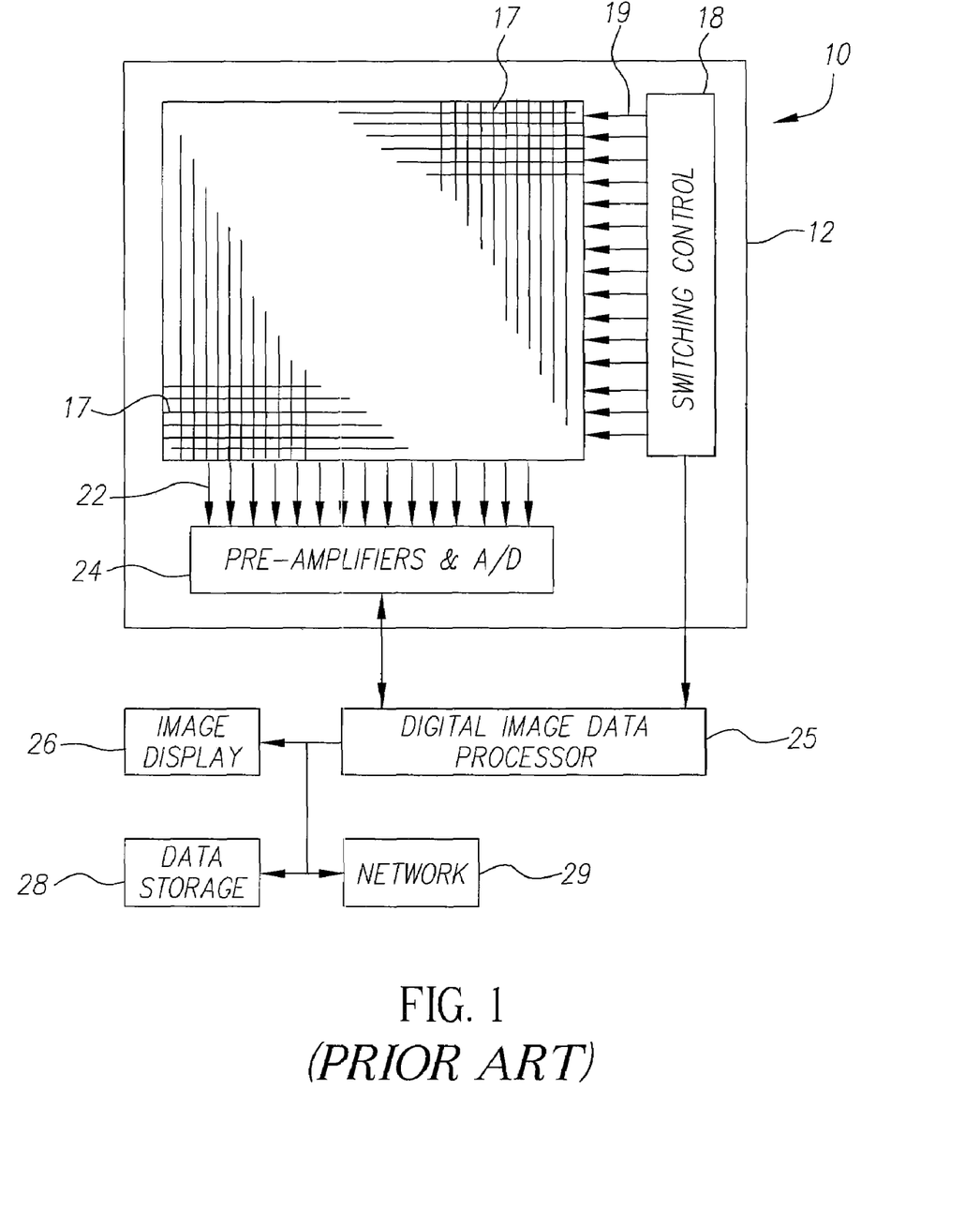
FIG. 1 is a graphical illustration of a prior art digital radiography system.
Figure 2:
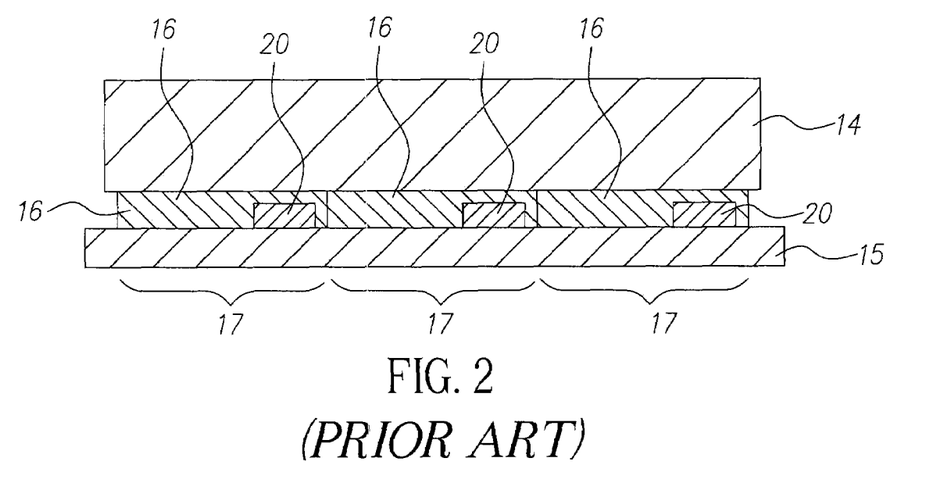
FIG. 2 is a side graphical view of a prior art pixel site for the system of FIG. 1.
Figure 3:
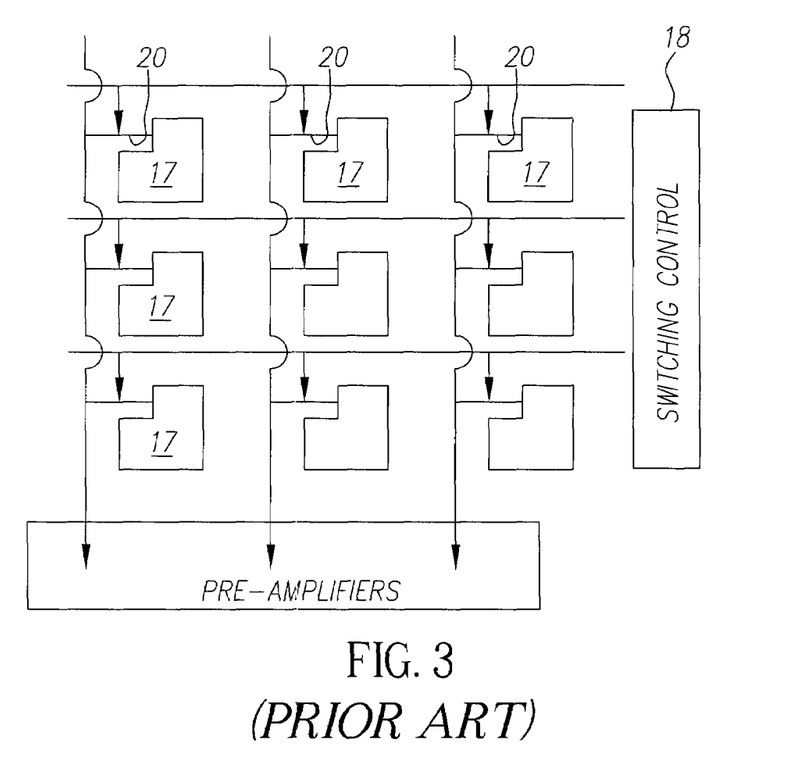
FIG. 3 is a graphical illustration of a portion of the pixel site array of the system of FIG. 1.

FIGS. 1-3 illustrate a conventional digital radiography system 10 which includes a digital radiography panel 12 having a substrate on which is formed a radiographic sensor layer 14 which generates electrons in response to impinging radiation e.g. X-rays. The term X-ray is used for convenience throughout this description and in the appended claims. However, it will be understood that the invention is useful in digital radiography employing other forms of radiation and, thus, the term X-ray herein shall be interpreted to cover such other forms of radiation as are used. The radiation-generated electrons are captured by capacitors 16 which are arrayed on substrate 15 in rows and columns and which thereby define discrete pixel sites 17. After exposure of a subject, the capacitors are addressed, a row at a time, by switching control circuit 18 via conductors 19 and solid state switches 20 to transfer the respective charge values via read-out lines 22 to external electronics circuitry 24, which includes preamplifiers and analog-to-digital (A:D) converters, to convert the charge values to voltage values and then into digital numeric data, typically 14 bits per pixel. Once digitized, the data is transferred to suitable digital image processor circuits 25 and applied to image display 26 for viewing. The data may also be stored in data storage memory 28 and/or sent to a network 29 for communication to a remote site for viewing.

The read-out of millions of pixel charge values involves use of high bandwidth analog electronics and also exposes individual pixel values to cross talk from adjacent pixels. As previously mentioned, the high bandwidth analog electronics increases noise in the analog signals. Additionally, cross talk serves to contaminate each pixel value.

There is a need therefore, for a digital radiography panel system that avoids the problems associated with existing panel systems utilizing analog signal read-out. The present invention serves that need.

SUMMARY OF THE INVENTION

In accordance with the invention, therefore, a novel low noise electronic data capture and read-out system for digital radiography is provided that comprises a two dimensional array of discrete X-ray detection pixel sites in which each pixel site has a charge storage element for storing a charge value which is proportional to X-ray fluence on the pixel site. The pixel site further includes integrated circuit means that includes a charge-to-time conversion circuit and an analog-to-digital conversion circuit. The charge-to-time conversion circuit converts the stored charge value to a time value representative of the stored charge value and the analog-to-digital converter converts the time value to corresponding digital data, at the pixel site, which is then representative of the stored charge value. The system further includes read-out electronics for transferring said digital data from each of the pixel sites to a data storage medium in an ordered data matrix representing a two dimensional image of X-ray fluence captured on the array of pixel sites.

In a modified embodiment of the invention, the system is operated in a calibration mode prior to capture of a patient exposure image. In this mode, the existence of inherent dark currents in the array of pixels is compensated for by measuring the dark currents during the calibration mode using the charge-to-time-to-digital procedure in each pixel site. The resultant dark current related data may then be read out for storage in memory for subsequent adjustment of patient image exposure data. In an alternative embodiment, an UP/DOWN counter is employed in the analog-to-digital converter. Operation of the counter in the down count mode enables dark current induced charge values to be converted into negative data values which are then held in the respective counters. When a patient image is exposed onto the panel, the counter is then operated in an up count mode so that dark current counts are automatically compensated out of the resultant net image count values. In a similar manner, flat field calibration may be accomplished either by pre-charging the pixel capacitors to a known charge value for conversion to data values during flat field calibration or a series of uniform X-ray exposure fields to generate the flat field data. The data may then be read out and stored for use in compensating patient image data generated from the novel panel system of the invention.

An important advantage of the invention is that only digital data is read out of the pixel array. Since individual pixel values can be digitized over a time span of hundreds of milliseconds, this avoids the problems of noise and crosstalk contamination with direct read-out of analog values in conventional digital radiography panel systems.

DETAILED DESCRIPTION OF THE INVENTION

Figure 4:
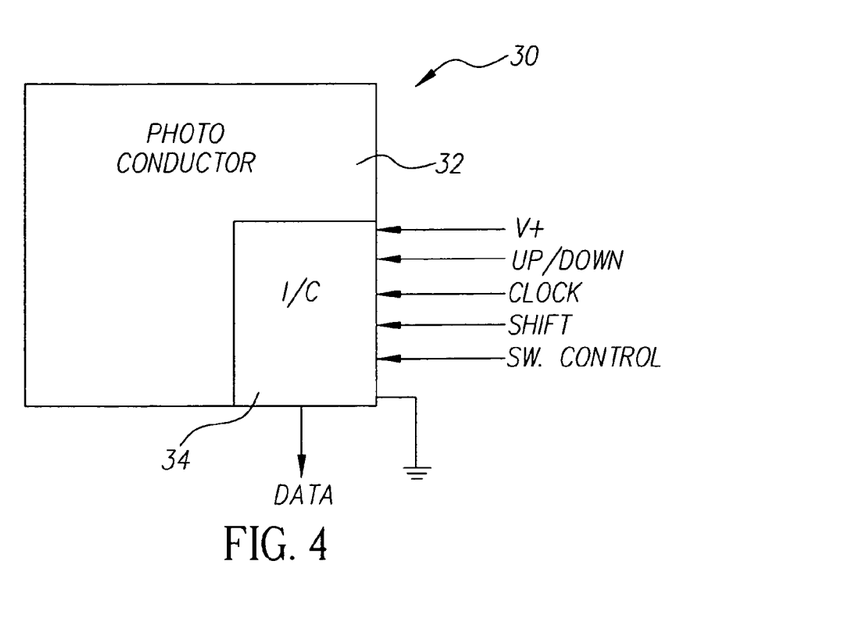
FIG. 4 is graphical illustration of a pixel site for a digital radiography panel in accordance with the invention.
Figure 5:
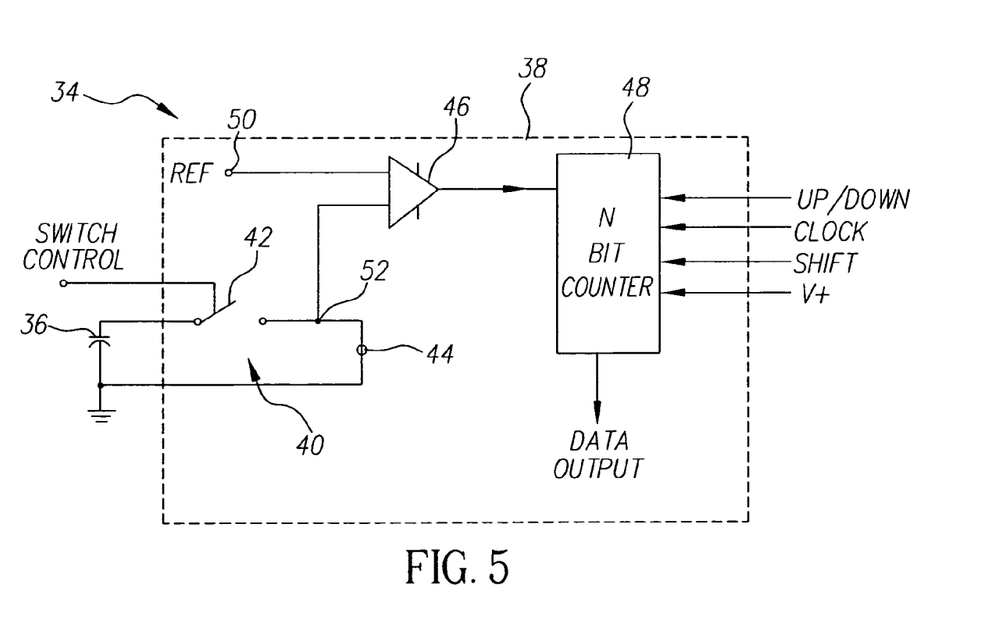
FIG. 5 is a circuit schematic for the integrated circuit portion of the pixel site of FIG. 4

Turning now to FIGS. 4 and 5, pixel site 30 includes a photoconductor 32 and an integrated circuit 34 and represents one of a two dimensional array of discrete pixel sites used on a digital radiographic panel in accordance with the invention. The pixel site includes a charge storage element, e.g. a capacitor 36, and an A/D converter circuit 38 which includes a capacitor discharge circuit 40, a comparator circuit 46 and an N bit counter 48. The particular pixel site illustrated is known for use in a direct radiography system and is used in this embodiment for illustrative purposes. It will be appreciated by those skilled in the art that the present invention may also be implemented in an indirect radiography system or in any radiography system where the X-ray fluence is represented by a charge on the pixel. The discharge circuit comprises a controlled field effect transistor (FET) switch 42 and a constant current source 44. Comparator circuit 46 has a first input terminal 50 coupled to a reference source, e.g. ground, and a second input terminal 52 coupled to the capacitor discharge circuit 40. The output of comparator 46 is asserted high when the level on input terminal 52 is above the level on input terminal 50 and is asserted low when terminal 52 level is at or below that of terminal 50. The output of comparator 46 serves as an ENABLE/DISABLE signal applied to a count control input of counter 48. Inputs to counter 48 include the input from comparator 46, a power source V+, a clock signal, an UP/DOWN control signal, and a shift control signal. It will be appreciated by those skilled in the art that the configuration of capacitor discharge circuit 40 with comparator circuit 46 constitutes the well known Wilkinson circuit which operates to convert a charge voltage on a capacitor to a time value.

In digital radiography systems it is known to employ, in the digital image processor 25 (FIG. 1), a transform to convert linear output data to non-linear data output for purposes of display and hardcopy output to account for the human visual system. In the present invention, such transforms may be conveniently implemented directly in the A/D conversion by means of a variable frequency clock control to appropriately vary the frequency of the counter.

Figure 6:
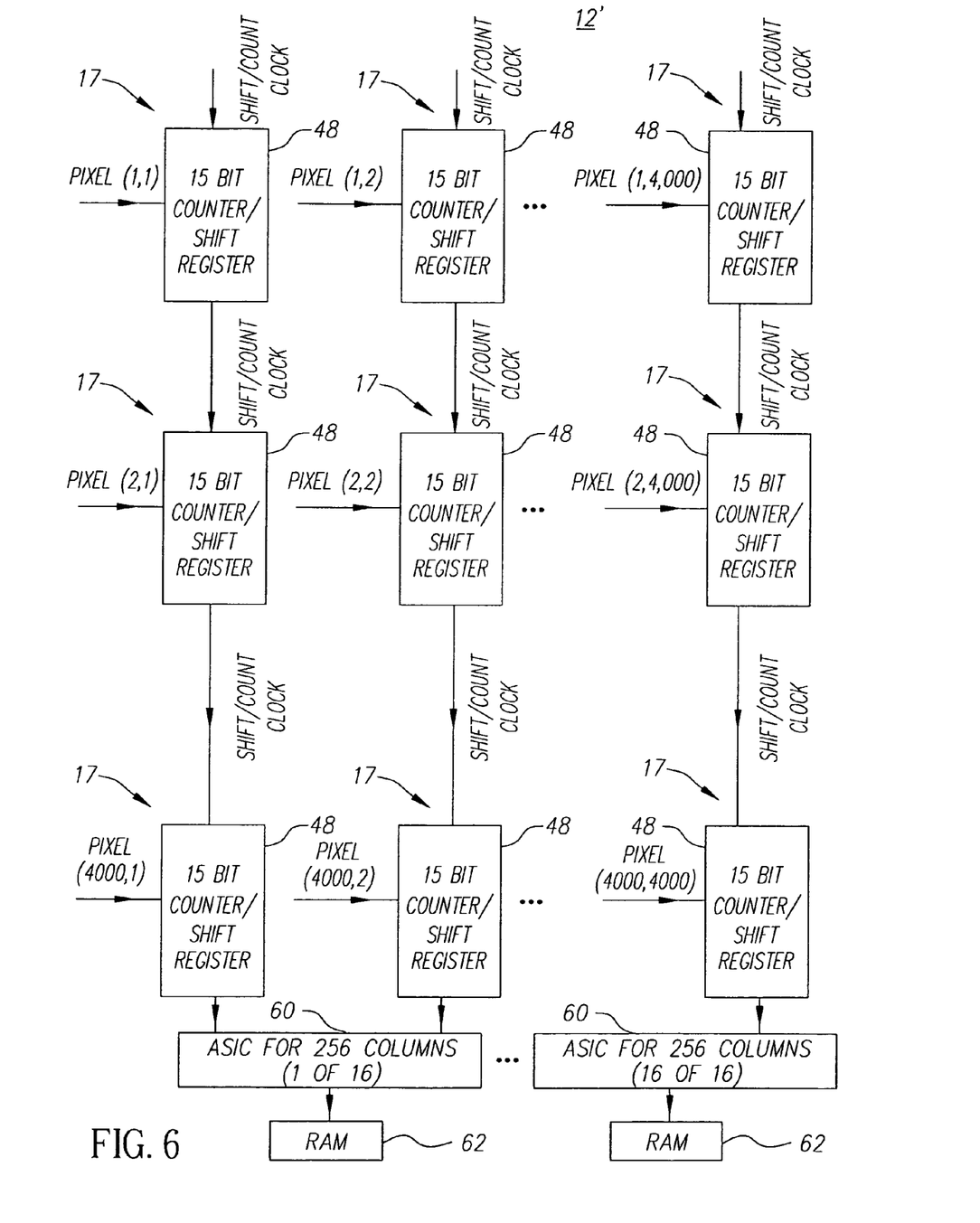
FIG. 6 is a diagram of the digital radiography panel of the invention.

FIG. 6 illustrates, diagrammatically, a radiographic panel 12' in which counters 48 are configured in an example utilizing a 4000×4000 array of pixel sites. It will be appreciated that the invention may be effectively utilized in other pixel arrays, the particular array being a matter of design choice. The counters serve as digital data counters and as shift registers aligned in vertical columns for serial read-out, column-by-column of data generated at each of the pixel sites. The read-out data is transferred to application specific integrated circuits 60 (ASICs) structured, for read-out efficiency, with each ASIC handling 256 columns, for a total of 16 ASICS. Functionally, the ASICS are designed to arrange the data from the counters into an ordered data matrix corresponding to the two dimensional image of X-ray fluence on the array of pixel sites on panel 12'. The data from the ASICs are then transferred and stored in RAM units 62 for subsequent use in image display, network communication and long term storage in known manner.

Figure 7A:
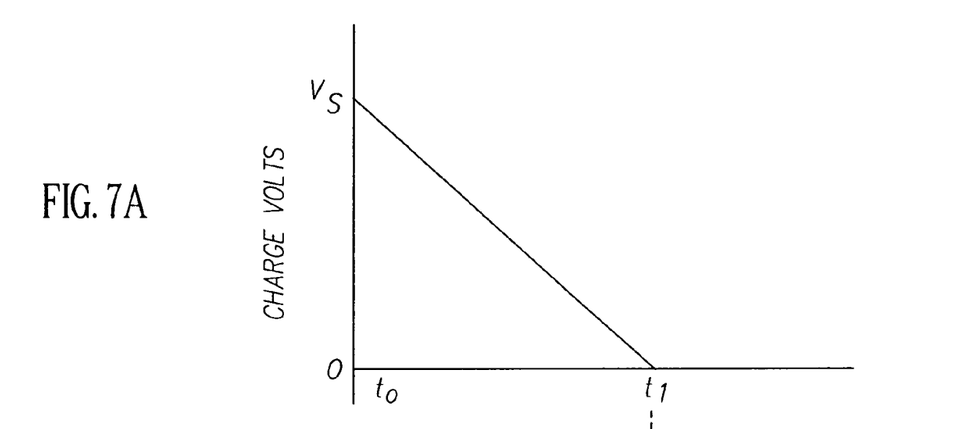
FIGS. 7a-7d and 8a-8e are timing diagrams useful in explaining the operation of the digital radiography system of the invention.
Figure 7B:
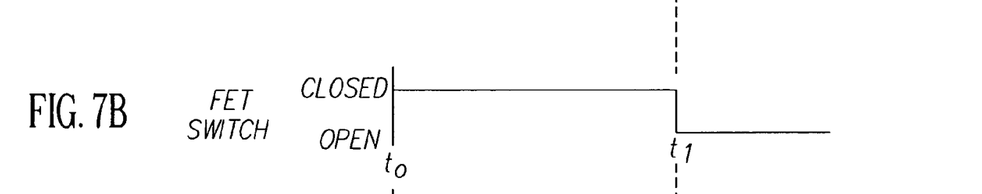
Figure 7C:
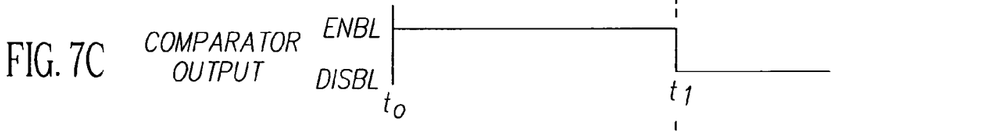
Figure 7D:
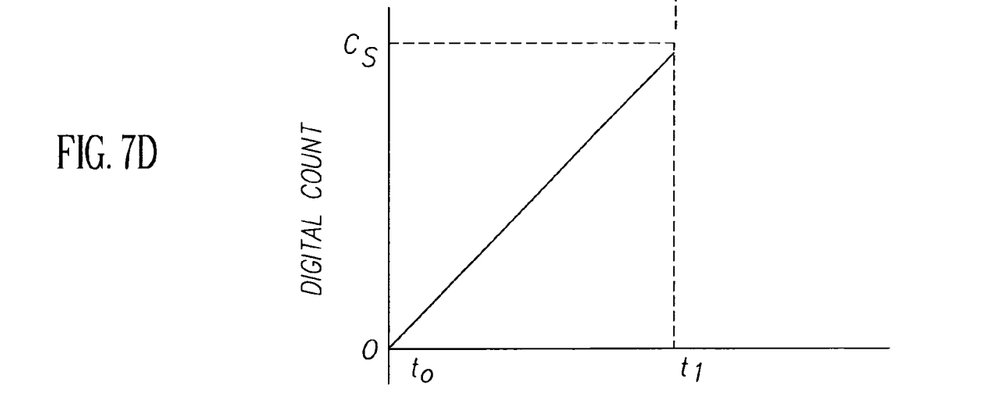

In operation, with joint reference to FIGS. 5 and 7a-7d, when panel 12' is exposed to X-rays, the X-ray fluence on photoconductor 32 generates electrons, proportional to the amount of X-ray fluence on the pixel site, which are stored as an electron charge value on capacitor 36. Read-out of the charge value commences at time $t_0$(FIG. 7a), when an applied switch control signal is asserted high (FIG. 7b) to electronically close FET switch 42 and cause constant current source 44 to discharge capacitor 36 at a controlled rate. It is assumed in this description that reference terminal 50 is at ground potential. As long as the voltage on capacitor 36 is above the reference level on terminal 50, the output level of comparator circuit 46 remains high (FIG. 7c) which enables counter 48 to count as clock pulses are supplied to the counter. When the voltage on capacitor 36 is fully discharged to the reference level on terminal 50 at time $t_1$, the output of comparator circuit 46 goes low which disables or stops counter 48 from counting. Thus the capacitor charge value $V_s$ is converted to time value $t_1$-$t_0$ which is converted by counter 48 to a digital count value $C_s$ (FIG. 7d).

Figure 8A:
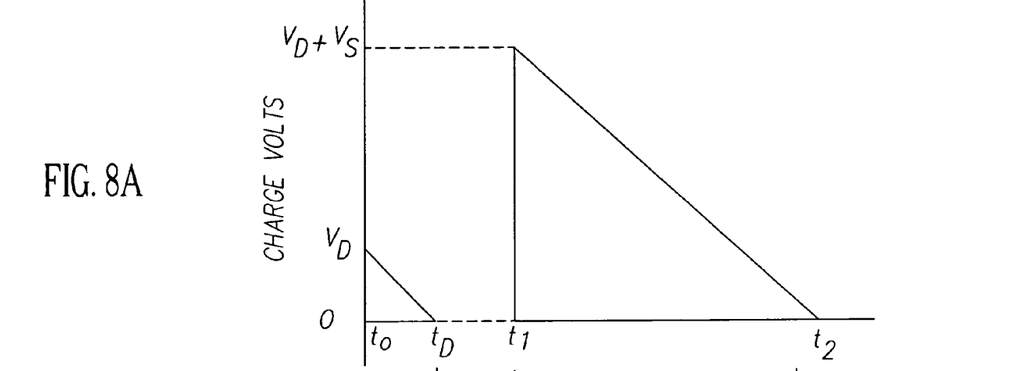
Figure 8B:
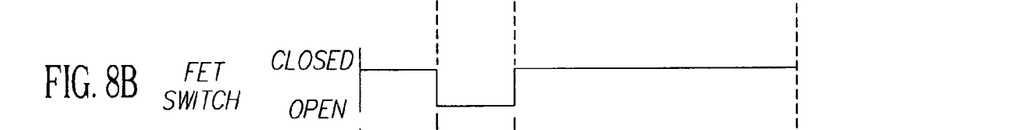
Figures 8C, 8D:
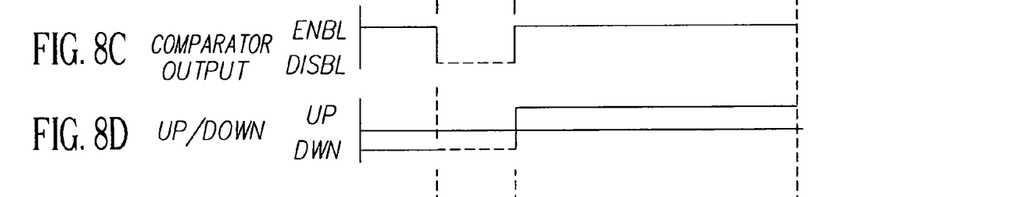
Figure 8E:
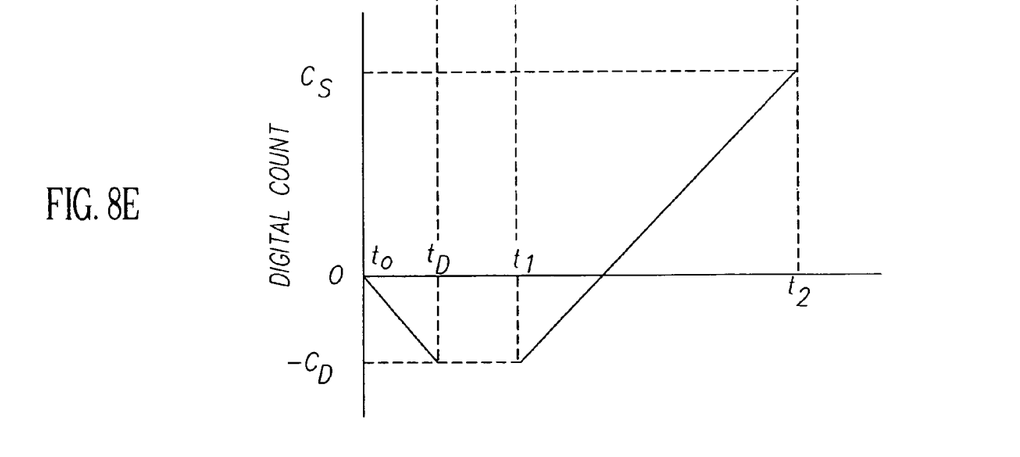

Calibration of the radiography system for inherent dark current values, which are unique to each pixel in the array, is readily accomplished in the operation of the system as will be described with referring to FIGS. 8a-8e. It is assumed that the counter has been initialized to a zero count and the capacitor has been similarly initialized to a zero charge value. Following initialization and with the X-ray source turned off, an accumulated positive charge $V_D$ (FIG. 8a) is built up on capacitor 36 due to dark currents. At the start of calibration, time $t_0$, FET switch 42 is closed (FIG. 8ab) and the positive charge on the capacitor causes comparator 46 to assert an ENABLE signal to the counter 48 (FIG. 8c). The UP/DOWN signal is also set low (FIG. 8d) so that the counter will count down while clock pulses are simultaneously applied to the counter. When the capacitor is discharged at time $t_D$ to the reference level on terminal 50, the output of comparator 46 goes low and stops the counter 48 at a count value of $-C_D$ (FIG. 8e) which represents the charge value resulting from dark current in the pixel. This count value remains stored in the counter 48 until the patient is exposed to X-rays. At time $t_1$, the charge value on the capacitor is the sum of the dark current value, which recurs in the interim between calibration and read-out of the patient exposure, plus the charge value $V_S$ resulting from X-ray fluence caused by X-ray exposure of the patient. However, since the counter starts from the calibration value $-C_D$, the net count remaining at time $t_2$, when the capacitor 36 is fully discharged and the counter 48 is stopped, is the desired count $C_S$ representing the X-ray fluence caused by the patient exposure. Thus a simple technique is made possible for dark current calibration. An alternative calibration may be applied with the foregoing system using a counter that only counts to positive count values. With this technique, positive dark current calibration values are read out and stored in memory before exposure of the patient to X-rays and the stored calibration value is then used to compensate the patient read out count values in digital data post-processing. Of course, the negative count values as described above can similarly be read out and stored for digital post-processing. With either of the latter two techniques, the counter is reset to zero before the X-ray source is turned on for patient exposure. It will appreciated that when a data transform is applied by varying frequency of the counter, as described above, such variation is normally employed only during generation of output data following the calibration phase.

Pixel-to-pixel variations caused by component variations, such as variations in the current source, can compensated for by charging each pixel capacitor 36 from an external source to a known charge and then reading the charge value that is thereby generated by following one of the processes described above. This count value is stored in memory on a pixel-to-pixel basis and is used to compensate for the component variations in the system. Alternatively, the system can be exposed using an X-ray source and multiplicities of different flat fields are digitized, the digital values then being used to compensate digitally for the variations.

Figure 9:
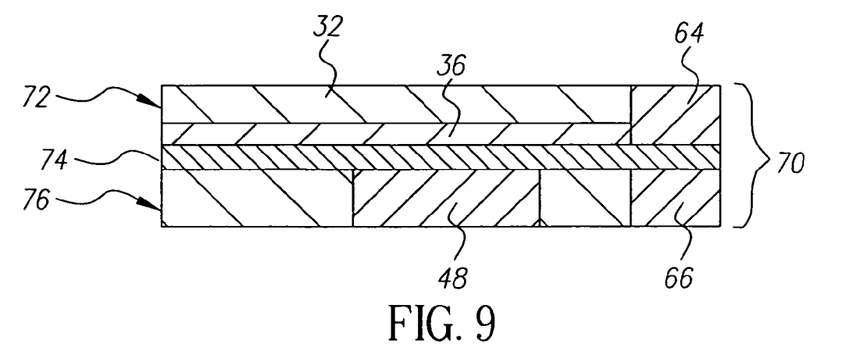
FIG. 9 is a side graphical view of a pixel site for an alternative embodiment of the invention.
Figure 10:
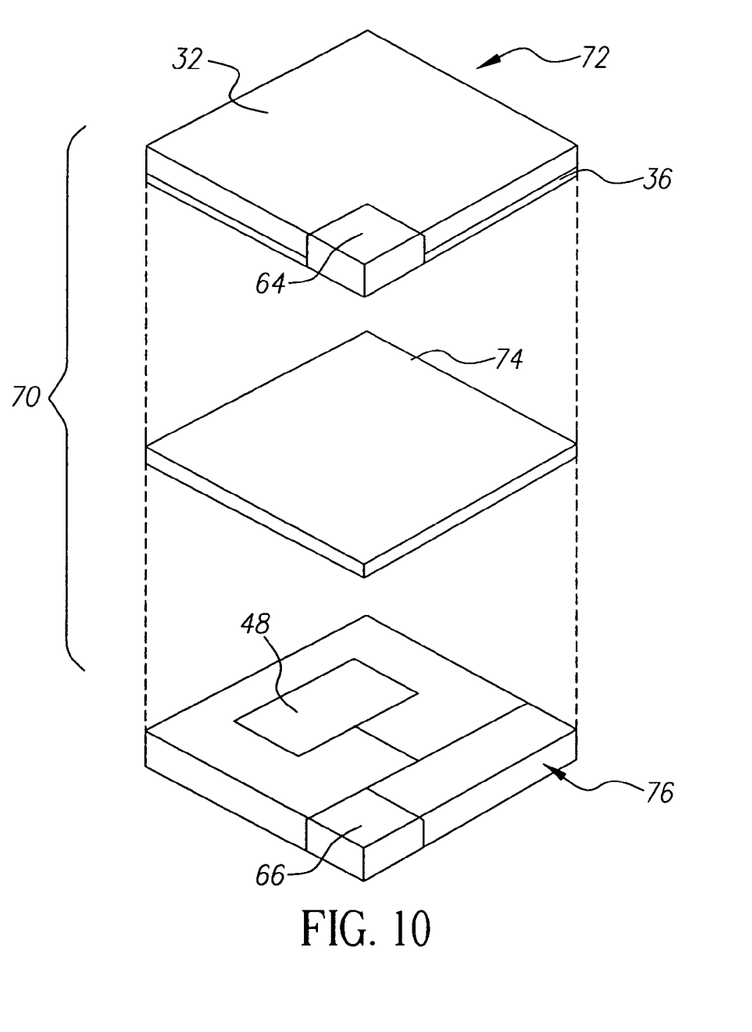
FIG. 10 is an exploded view of the pixel site of FIG. 9.

Referring again to FIG. 4, it will be noted that integrated circuit 34 occupies a portion of the area of the pixel site 30. It is desirable, of course, to minimize the fill factor created by the integrated circuit area. In the alternative embodiment of the invention shown in FIGS. 9 and 10, this objective is accomplished by means of a tiered pixel site 70 in which the photoconductor 32, capacitor 36, and modified integrator circuit 64 are located in a first tier layer 72 formed on one side of a substrate 74. The modified integrated circuit 64 includes the discharge circuit 40 and comparator circuit 46. The counter circuit 48 is moved to a second tier layer 76 of integrated circuit material on the opposite side of the substrate 74. With this arrangement, the fill factor on the photoconductor portion of the pixel site is markedly reduced since the bulk of the integrated circuitry associated with the counter circuit is removed to the back of the substrate.

Figure 11:
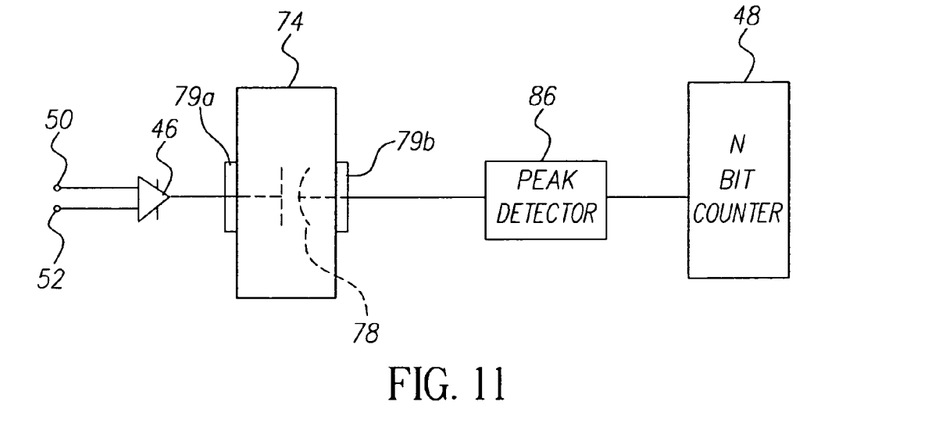
FIGS. 11-13 are simplified circuit schematics of alternative embodiments of signal coupling schemes for the pixel site of FIG. 9.
Figure 12:
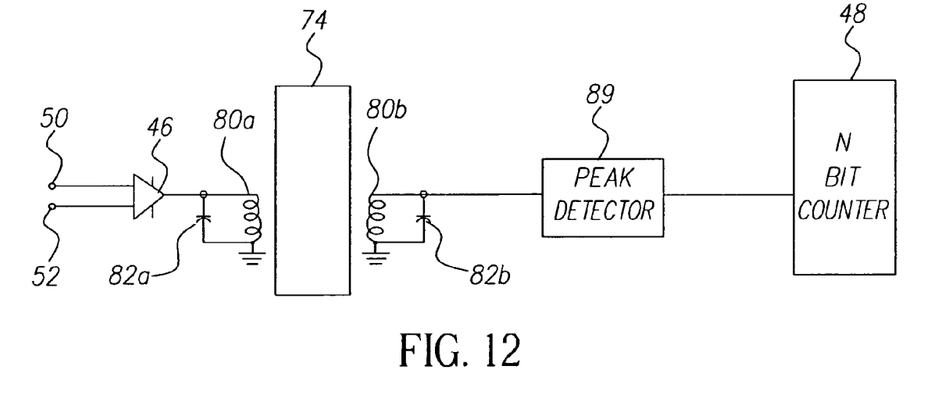
Figure 13:
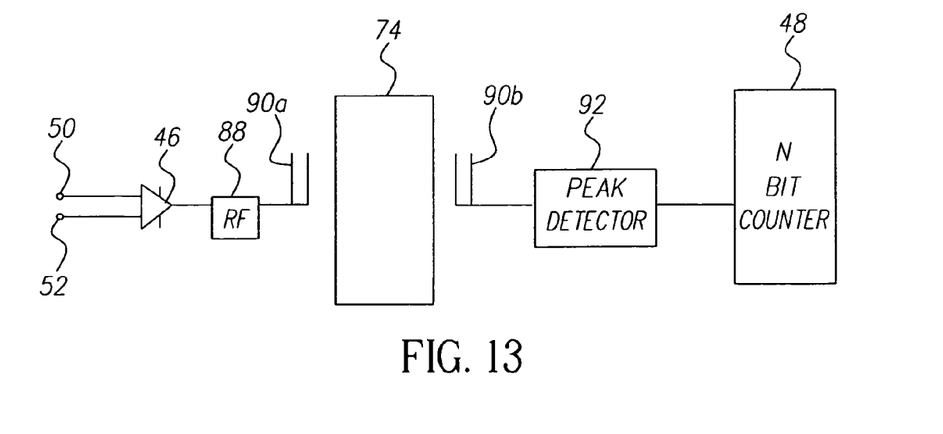

It is necessary to provide means for communicating the ENABLE/DISABLE signal from the output of comparator circuit 46 to the input of counter 48. This can be accomplished in a number of different ways. For this purpose, a portion of integrated circuit 64 and segment 66 of integrated circuit layer 76 are utilized for communicating the ENABLE/DISABLE signal. In the embodiment of FIG. 11 positive and negative going transitions between the ENABLE and DISABLE states are communicated as positive and negative pulses by a capacitive coupling 78 through the substrate 74 between capacitor plates 79a and 79b. The pulses with their polarities are detected by peak detector 86 before application to counter 48. In the embodiment of FIG. 12, the ENABLE/DISABLE transitions are communicated by inductive coupling between coils 80a, 80b formed in the integrated circuits on opposite sides of the substrate 74. These pulses are then detected by peak detector 89 and applied to counter 48. In a particularly preferred form of this embodiment, the inductive coupling is tuned to different coupling frequencies by means of added capacitors 82a, 82b. In this way, adjacent pixel sites can be tuned to different coupling frequencies in order to minimize crosstalk between the adjacent pixels can be minimized. In yet another embodiment illustrated in FIG. 13, coupling between the comparator output and the counter is achieved by means of transmission via an RF circuit 88 and RF antenna 90a at the comparator output to a receptor antenna 90b and peak detector 92 at the counter 48 input.

The invention has been described in detail with particular reference to certain preferred embodiments thereof, but it will be understood that variations and modifications can be effected within the spirit and scope of the invention.

PARTS LIST 10 prior art digital radiographic system
12 digital radiography panel
14 radiographic sensor
16 capacitors
17 pixel sites
18 switching control circuit
19 conductors
20 solid state switches
22 read-out lines
30 pixel site
32 photoconductor
34 integrated circuit
36 capacitor
38 A/D converter
40 capacitor discharge circuit
42 FET switch
44 constant current source
46 comparator circuit
48 N bit counter
50 reference input terminal
52 discharge circuit output terminal
60 ASICs
62 RAM units
70 tiered pixel site
72 first tier layer
74 substrate
76 second tier layer
78 capacitive coupling
79a,b capacitor plates
80a,b coils
82a,b tuning capacitors
86 peak detector
88 RF circuit
89 peak detector
90a,b RF antennas
92 peak detector

The invention claimed is:

1. A low noise electronic data capture and read-out system for digital radiography comprising:
a two dimensional array of discrete X-ray detection pixel sites, each pixel site having (a) a capacitor and a capacitor discharge circuit and a comparator circuit, the discharge circuit including a controlled solid state switch and a constant current source, the switch serving to isolate the storage capacitor when the switch is open, the constant current source serving to discharge the storage capacitor at a controlled rate when the switch is closed, the comparator circuit outputting a signal representing an end-of-discharge time for the capacitor, and (b) a stored charge-to-time conversion circuit responsive to the output signal from the comparator for converting the X-ray fluence proportional charge on the capacitor to a corresponding digital data value; and
read-out electronics for arranging and transferring said digital data from each of the pixel sites to a data storage medium in an ordered data matrix representing a two dimensional image of X-ray fluence on the array of pixel sites.

2. A low noise electronic data capture and read-out system for digital radiography comprising:
a two dimensional array of discrete X-ray detection pixel sites, each pixel site having (a) a charge storage element for storing charge proportional to X-ray fluence on the pixel site, and an N-bit digital counter; a discharge circuit selectively coupled to the charge storage element; a comparator circuit having inputs coupled to said discharge circuit and to a source of a reference voltage and having an output coupled to the N-bit counter that communicates an enable signal to the counter to enable counting while said storage element is being discharged toward said reference level and that communicates a disable signal to the counter at the end-of-discharge time to disable counting when the storage level on the storage element reaches said reference level for converting the X-ray fluence proportional charge on the storage element to a corresponding digital data value; and read-out electronics for arranging and transferring said digital data from each of the pixel sites to a data storage medium in an ordered data matrix representing a two dimensional image of X-ray fluence on the array of pixel sites.

3. The system of claim 2 wherein the counter comprises a variable frequency clock and a clock controller connected to the clock to vary the frequency of the counter to apply an predetermined transform to output data to account for perception by a human visual system for display or hardcopy output purposes.

4. A low noise electronic data capture and read-out system for digital radiography comprising:

a two dimensional array of discrete X-ray detection pixel sites, each pixel site having (a) a charge storage element for storing charge proportional to X-ray fluence on the pixel site, and an N-bit UP/DOWN digital counter having an UP/DOWN control signal input; a discharge circuit selectively coupled to the charge storage element; a comparator circuit having inputs coupled to said discharge circuit and to a source of a reference voltage and having an output coupled to the N-bit counter that communicates an enable signal to the counter to enable counting while said storage element is being discharged toward said reference level and that communicates a disable signal to the counter at the end-of-discharge time to disable counting when the storage level on the storage element reaches said reference level for converting the X-ray fluence proportional charge on the storage element to a corresponding digital data value; and read-out electronics for arranging and transferring said digital data from each of the pixel sites to a data storage medium in an ordered data matrix representing a two dimensional image of X-ray fluence on the array of pixel sites.

5. A low noise electronic data capture and read-out system for digital radiography comprising:

(a) a substrate;

(b) a two dimensional array of discrete X-ray detection pixel sites, each pixel site including a first tier layer and a second tier layer formed on opposite sides of said substrate, the first tier layer including (i) an X-ray sensitive capture medium, (ii) a charge storage element for storing charge proportional to X-ray fluence on the pixel site capture medium, and (iii) integrated circuit means including a stored charge-to-time conversion circuit;

the second tier layer including an analog-to-digital converter and signal coupling means connecting the converter to the charge-to-time conversion circuit through the substrate for converting X-ray fluence proportional charge on the storage element to a corresponding digital data value, the; and (c) read-out electronics for arranging and transferring said digital data from each of the pixel sites to a data storage medium in an ordered data matrix representing a two dimensional image of X-ray fluence on the array of pixel sites.

6. The system of claim 5 the coupling means comprises a capacitive coupling between said charge-to-time conversion circuit to said analog-to-digital converter.

7. The system of claim 5 wherein the coupling means comprises a first coil in the first tier layer coupled to the charge-to-time conversion circuit and a second coil in the second tier layer coupled to said analog-to-digital converter, the first and second coils being inductively coupled through said substrate.

8. The system of claim 7 wherein the coupling means includes tuning capacitors coupled to each of the coils for setting a tuned coupling frequency between the coils which differs from tuned coupling frequencies of adjacent pixel sites.

9. The system of claim 5 wherein the coupling means comprises a radio frequency circuit and transmitting antenna in the first tier layer coupled to the charge-to-time conversion circuit and a second radio frequency circuit and receiving antenna in the second tier layer coupled to said analog-to-digital converter, said charge-to-time conversion circuit being coupled through the substrate by radio frequency transmission and reception between said antennas.

10. A method of operating an imaging panel for a low noise digital radiography system to compensate for dark current values in pixel sites on the panel, each of the sites having an electron storage element, a stored charge-to-time conversion circuit and an analog-to-digital converter, the method comprising the steps of:

during a dark current calibration period prior to exposing a patient to X-rays:

(a) accumulating a dark current generated charge on the storage element;

(b) converting the dark current charge to a first time value;

(c) converting the first time value to a dark current digital value at the pixel site;

(d) storing the dark current digital value; and following a patient X-ray exposure period:

(e) generating a cumulative charge on the storage element representative of combined dark current charge and charge generated by impinging X-rays on the pixel site;

(f) converting the cumulative charge to a second time value;

(g) converting the second time value to a cumulative digital value at the pixel site; and (h) combining the stored dark current digital value with the cumulative digital value to generate a residual digital value representative of impinging X-rays produced from exposure of X-rays on the patient.

11. The method of claim 10 wherein the combining of digital values in step (h) is performed in digital data processing circuits external to said pixel site.

12. A method of operating an imaging panel for a low noise digital radiography system to compensate for dark current values in pixel sites on the panel, each of the sites having an electron storage element, a stored charge-to-time conversion circuit and an analog-to-digital converter including an UP/DOWN counter, the method comprising the steps of:

during a dark current calibration period prior to exposing a patient to X-rays:

(a) accumulating a dark current generated charge on the storage element;

(b) converting the dark current charge to a first time value;

(c) converting the first time value by operation of the counter in one of either an UP or DOWN direction;

(d) storing the dark current digital value in said counter as one polar digital value; and (e) generating a cumulative charge on the storage element representative of combined dark current charge and charge generated by impinging X-rays on the pixel site;

(f) converting the cumulative charge to a second time value;

(g) converting the second time value to a cumulative digital value at the pixel site by operation of said counter in the other of said UP or DOWN directions beginning from the stored polar digital in step (d); and following a patient X-ray exposure period;

(h) combining the stored dark current digital value with the cumulative digital value to generate a residual digital value representative of impinging X-rays produced from exposure of X-rays on the patient whereby, at the end of step (g) said cumulative digital value on said counter is equal to the residual value of step (h).

13. The method of claim 12 wherein counter frequency is varied to inject a predetermined transform on digital output data to account for perception by a human visual system for display or hardcopy output purposes.

* * * * *